United States Patent
Kawaguchi

(10) Patent No.: US 7,801,003 B2
(45) Date of Patent: Sep. 21, 2010

(54) OPTICAL DISC TYPE DETERMINING METHOD AND OPTICAL DISC DEVICE

(75) Inventor: Mashiro Kawaguchi, Gunma-ken (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 317 days.

(21) Appl. No.: 12/155,342

(22) Filed: Jun. 3, 2008

(65) Prior Publication Data
US 2008/0247291 A1  Oct. 9, 2008

(30) Foreign Application Priority Data

Jun. 4, 2007 (JP) ............................. 2007-148335
Aug. 31, 2007 (JP) ............................. 2007-225039

(51) Int. Cl.
*G11B 5/58* (2006.01)
(52) U.S. Cl. ................................. 369/53.23
(58) Field of Classification Search ............... 369/53.23
See application file for complete search history.

(56) References Cited

U.S. PATENT DOCUMENTS 6,298,024 B1 * 10/2001 Nomura ................... 369/53.22
6,999,387 B2 * 2/2006 Kuwayama ............... 369/44.23
7,190,650 B2 * 3/2007 Fujiune et al. ........... 369/53.22
7,289,405 B2 * 10/2007 Kim et al. ................. 369/53.23
2001/0030915 A1 * 10/2001 Suzuki ..................... 369/44.29

FOREIGN PATENT DOCUMENTS

JP  11-066712 A  3/1999

* cited by examiner

*Primary Examiner*—Aristotelis Psitos
(74) *Attorney, Agent, or Firm*—The Nath Law Group; Jerald L. Meyer; Derek Richmond

(57) ABSTRACT

Whether an optical disc is a first optical disc or not is determined with reference to at least one of first and second focus error signal amplitude values. Then, if a sum value of the addition of a first focus balance signal value (CD-FBAL signal value) to a second focus balance signal value (DVD-FBAL signal value) is equal to or more than a predetermined threshold value, the signal surface of the optical disc is determined to be a CD signal surface of a dual disc. On the other hand, if the sum value is smaller than the predetermined threshold value, the signal surface of the optical disc is determined to be a DVD signal surface of a DVD or a DVD signal surface of a dual disc.

6 Claims, 8 Drawing Sheets

FIG. 1A  CD10
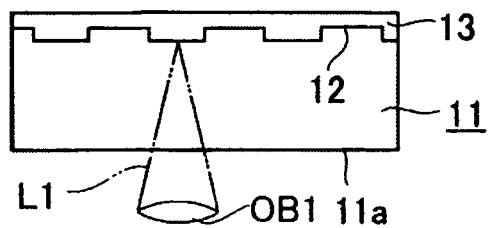
FIG. 1B  DVD-SL20
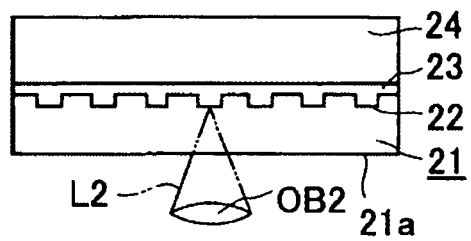
FIG. 1C  DVD-DL30
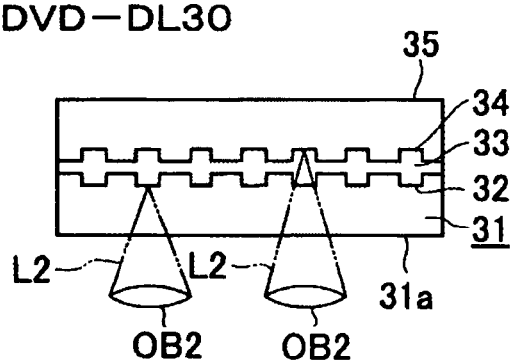
FIG. 1D  Dual Disc 40
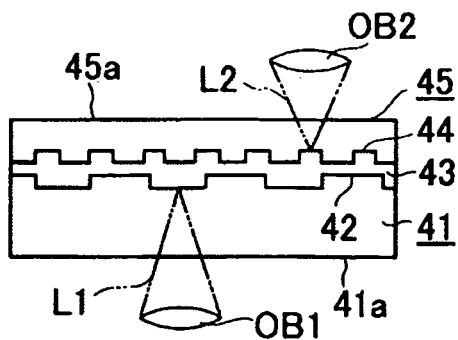

FIG. 6A
CASE WHERE FIRST CD LASER BEAM L1 IS APPLIED TO CD SIGNAL SURFACE 12 OF CD 10

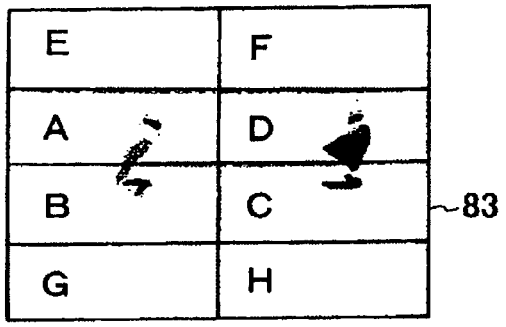

FIG. 6B
CASE WHERE FIRST CD LASER BEAM L1 IS APPLIED TO CD SIGNAL SURFACE 42 OF DUAL DISC 40

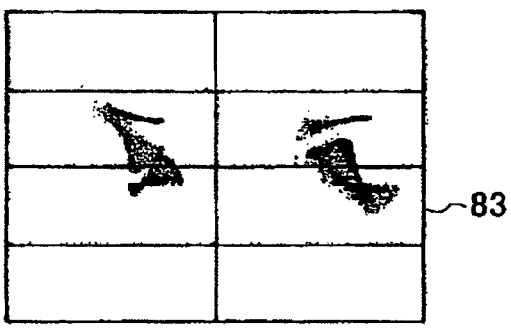

FIG. 6C
CASE WHERE FIRST CD LASER BEAM L1 IS APPLIED TO DVD SIGNAL SURFACE 22 OF DVD-SL 20

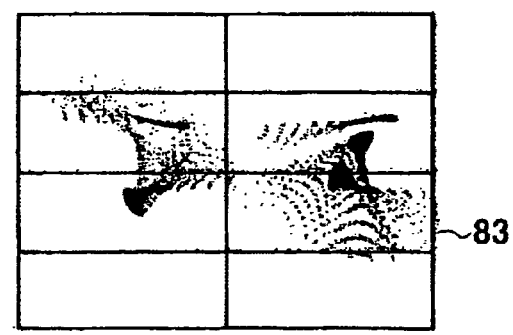

FIG. 6D
CASE WHERE SECOND DVD LASER BEAM L2 IS APPLIED TO CD SIGNAL SURFACE 12 OF CD 10

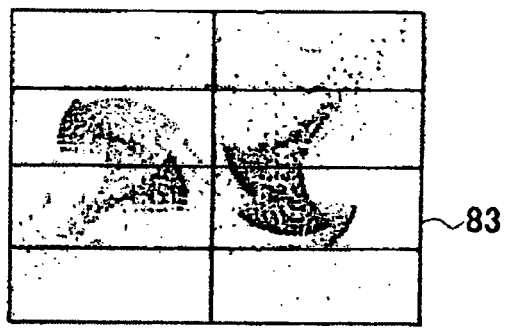

FIG. 6E
CASE WHERE SECOND DVD LASER BEAM L2 IS APPLIED TO CD SIGNAL SURFACE 42 OF DUAL DISC 40

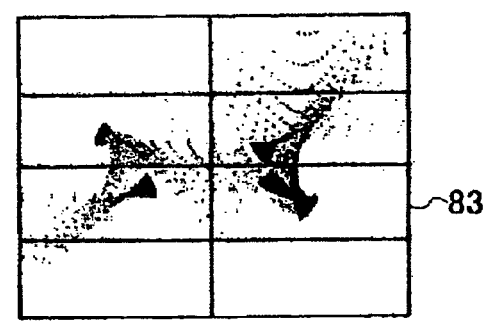

FIG. 6F
CASE WHERE SECOND DVD LASER BEAM L2 IS APPLIED TO DVD SIGNAL SURFACE 22 OF DVD-SL 20

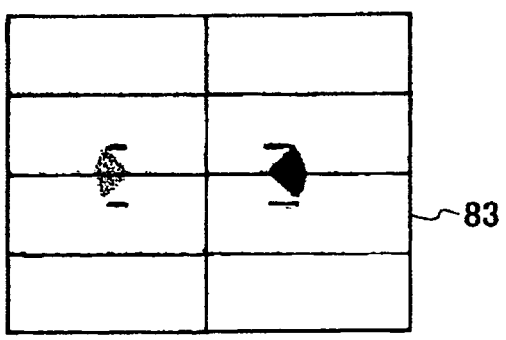

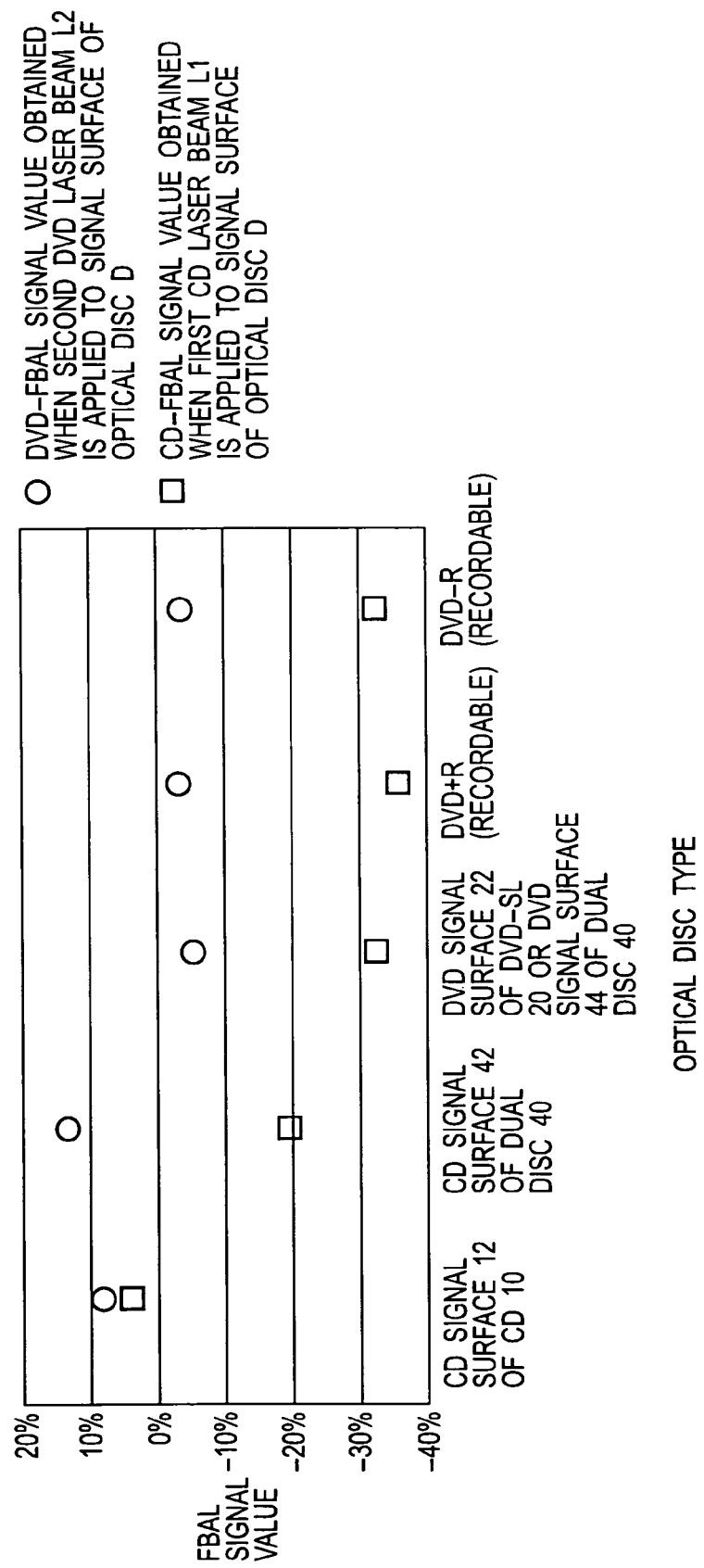

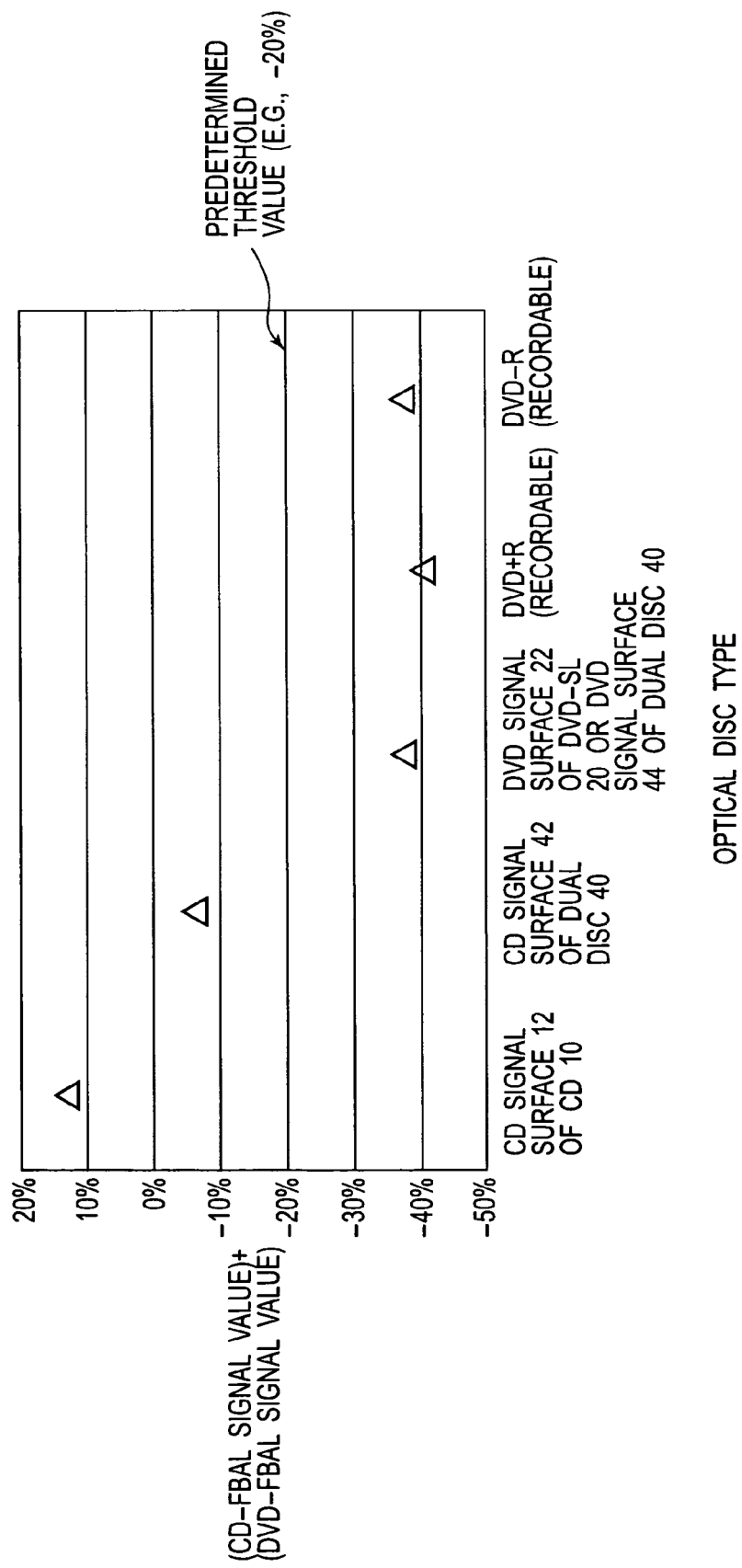

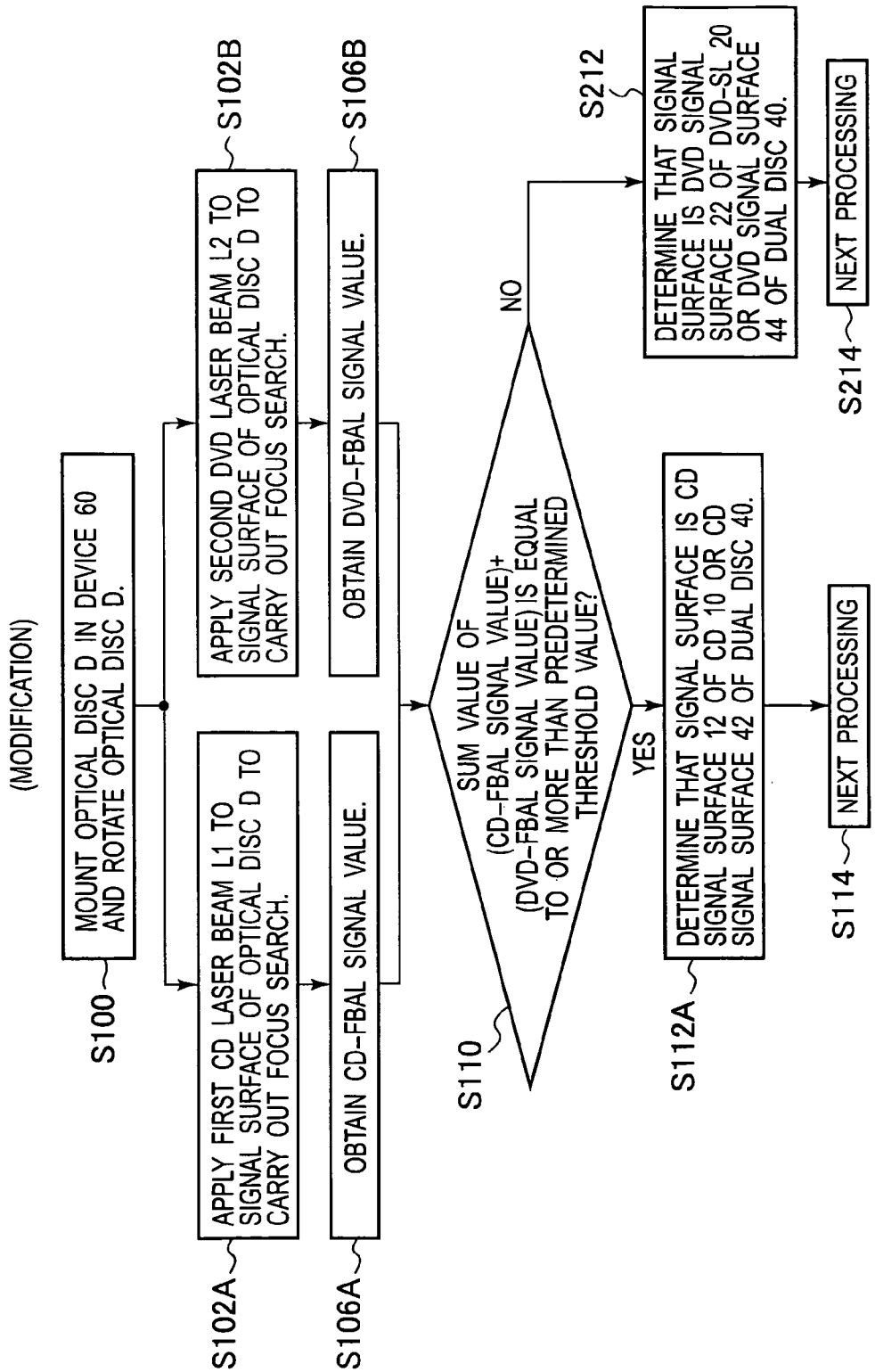

OPTICAL DISC TYPE DETERMINING METHOD AND OPTICAL DISC DEVICE

BACKGROUND OF THE INVENTION

1. Field of the Invention

The present invention relates to an optical disc type determining method and an optical disc device, capable of reliably determining a CD signal surface of a double-sided dual disc which has, on one side, a DVD signal surface for recording data compliant with a DVD standard and, on the other side, the CD signal surface for recording data compliant with a signal standard equivalent to a CD standard, and also capable of reliably determining a plurality of types of optical discs.

2. Description of the Related Art

Generally, in circular-plate-shaped optical discs, information signals such as music data, image data or computer data are highly densely recorded in a track spirally (or concentrically) formed on a signal surface of a substrate of the optical disc, and a desired track can be accessed at high velocity when a recorded track is played back, such that the optical discs are used in various ways.

The optical discs of this kind can be broadly classified into a playback-only type in which a reflection film of, for example, aluminum is attached onto a track composed of uneven pit lines to form a signal surface, and a record/playback type in which a recording film and a reflection film are sequentially attached onto a track composed of concave grooves and convex lands to form a signal surface.

Furthermore, the optical disc is rotatably mounted on a turntable provided in an optical disc device, and a laser beam emitted from an objective lens in an optical pickup enters the optical disc through a beam entrance surface of an optical disc substrate, and then this laser beam is applied in a spot form onto the signal surface located a predetermined distance away from the beam entrance surface, thereby carrying out recording or playback. There are a plurality of types of optical discs depending on the recording format of information signals to be recorded in the signal surface:

FIGS. 1A to 1D schematically show diagrams to explain the plurality of types of optical discs, wherein FIG. 1A shows a CD, FIG. 1B shows a DVD-SL having a single-layer type signal surface, FIG. 1C shows a DVD-DL having a double-layer type signal surface, and FIG. 1D shows a double-sided dual disc.

First, as shown in FIG. 1A, a compact disc (CD) 10 is formed into the shape of a circular plate having an optical disc substrate 11 of about 120 mm in diameter and a central hole of 15 mm in diameter, the thickness of the substrate being about 1.2 mm. A CD signal surface 12 recording, for example, music data in compliance with a CD format is formed with a wide track pitch about 1.2 mm away from a beam entrance surface 11a of this optical disc substrate 11. Further, a protective film 13 is attached onto the CD signal surface 12. Then, a first laser beam L1 at a wavelength of the order of 780 nm narrowed by an objective lens OB1 having a numerical aperture (NA) of about 0.45 enters the optical disc from the side of the beam entrance surface 11a of the optical disc substrate 11 and is applied to the CD signal surface 12.

Next, as shown in FIG. 1B, a DVD-SL (digital versatile disc-single layer) 20 having a single-layer type signal surface is formed into the shape of a circular plate having a total thickness of about 1.2 mm in which an optical disc substrate 21 having a thickness of about 0.6 mm and a reinforcing substrate 24 hating a thickness of about 0.6 mm are affixed together via an adhesive layer 23. A DVD signal surface 22 recording, for example, image data in compliance with a DVD format is formed about 0.6 mm away from a beam entrance surface 21a of the lower optical disc substrate 21 with a smaller track pitch and a higher density than those of the CD signal surface 12 of the CD 10. Then, a second laser beam L2 at a wavelength of the order of 650 nm narrowed by an objective lens OB2 having a numerical aperture (NA) of about 0.6 enters the optical disc from the side of the beam entrance surface 21a of the optical disc substrate 21 and is applied to the DVD signal surface 22.

Next, as shown in FIG. 1C, a DVD-DL (digital versatile disc-dual layer) 30 having a double-layer type signal surface is formed into the shape of a circular plate having a total thickness of about 1.2 mm in which first and second optical disc substrates 31, 35 each having a thickness of about 0.6 mm are affixed together via an adhesive layer 33. A first DVD signal surface 32 recording, for example, image data in compliance with the DVD format is formed about 0.6 mm away from a beam entrance surface 31a of the lower first optical disc substrate 31 in such a manner as to attach a semi-transmissive reflection film, and a second DVD signal surface 34 recording, for example, image data in compliance with the DVD format is formed on the upper second optical disc substrate 35 in proximity to the first DVD signal surface 32. Then, the second laser beam L2 at a wavelength of the order of 650 nm narrowed by the objective lens OB2 having a numerical aperture (NA) of about 0.6 enters the optical disc from the side of the beam entrance surface 31a of the first optical disc substrate 31 and is applied to the first DVD signal surface 32 or the second DVD signal surface 34.

Next, as shown in FIG. 1D, a double-sided dual disc 40 for recording or playing on both sides, which has only recently been developed, is formed into the shape of a circular plate having a total thickness of about 1.5 mm, wherein a first optical disc substrate 41 having a thickness of about 0.9 mm and a second optical disc substrate 45 having a thickness of about 0.6 mm are affixed together so that signal surfaces 42, 44 may be back to back to each other via an adhesive layer 43. A CD signal surface 42 which records, for example, music data in compliance with the CD format and which is equivalent to the CD signal surface 12 of the CD 10 is formed with a wide track pitch about 0.9 mm away from one beam entrance surface 41a on the side of the lower first optical disc substrate 41. A DVD signal surface 44 recording, for example, image data in compliance with the DVD format is formed about 0.6 mm away from the other beam entrance surface 45a on the side of the upper second optical disc substrate 45 with a smaller track pitch than that of the CD signal surface 42. Then, the first laser beam L1 at a wavelength of the order of 780 nm narrowed by the objective lens OB1 having a numerical aperture (NA) of about 0.45 enters the optical disc from the side of the beam entrance surface 41a of the first optical disc substrate 41 and is applied to the CD signal surface 42. On the other hand, after the dual disc 40 is inverted to the side of the second optical disc substrate 45, the second laser beam L2 at a wavelength of the order of 650 nm narrowed by the objective lens OB2 having a numerical aperture (NA) of about 0.6 is applied to the DVD signal surface 44 from the side of the beam entrance surface 45a of the second optical disc substrate 45.

Here, when a plurality of types of optical discs are selectively recorded or played in the same optical disc device, it is necessary to previously determine the plurality of types of optical discs in the optical disc device, and there is a method of determining the above-mentioned optical discs: the CD 10, the DVD-SL 20 having the single-layer type signal surface, and the DVD-DL 30 having the double-layer type signal surface (e.g., Japanese Patent Publication Laid-open No. 11-066712).

Now, according to the disc determining method disclosed in Japanese Patent Publication Laid-open No. 11-066712 mentioned above, although not shown here, the optical pickup is put into a CD playback state to carry out a focus search operation, and the difference between a maximum value and a minimum value of an obtained pickup output is defined as a first waveform level. The optical pickup is then put into a DVD playback state to carry out a focus search operation, and the difference between a maximum value and a minimum value of an obtained pickup output is defined as a second waveform level. The ratio between the first and second waveform levels is compared with a predetermined value to determine the types of the optical discs. Thus, when the plurality of types of optical discs different from each other in recording format are determined by the output of the optical pickup, the types of the optical discs are accurately determined even in the case of optical recording media such as a DVD and a CD that are about the same in reflectivity. It is also possible to reliably determine the single-layer/double-layer discs such as the above-mentioned DVD-SL 20 and DVD-DL 30.

However, in the above-mentioned double-sided dual disc 40 for recording or playing on both sides, the signal standard of the CD signal surface 42 is equivalent to the CD standard as described above, but the distance from the beam entrance surface 41*a* of the first optical disc substrate 41 to the CD signal surface 42 is about 0.9 mm (e.g., 0.87 mm, 0.89 mm, 0.93 mm) which is about 0.3 mm shorter than that in the CD standard. That is, the CD signal surface 42 of the dual disc 40 is located substantially in the midpoint between the CD signal surface 12 of the CD 10 about 1.2 mm away from the beam entrance surface 11*a* of the optical disc substrate 11 and the DVD signal surface 22 of the DVD-SL 20 about 0.6 mm away from the beam entrance surface 21*a* of the optical disc substrate 21 or the first, second DVD signal surface 32, 34 of the DVD-DL 30 about 0.6 mm away from the beam entrance surface 31*a* of the first optical disc substrate 31. Therefore, even if the technical idea of the disc determining method disclosed in Japanese Patent Publication Laid-open No. 11-066712 is applied, there arises a problem that the CD signal surface 42 of the dual disc 40 can not be identified or erroneously recognized.

Moreover, as the position from the beam entrance surface is difference between the CD signal surface 42 of the dual disc 40 and the CD signal surface 12 of the CD 10, there is a problem that normal playback can not be carried out in a CD standard setting and that much time is required for the adjustment of a focal position.

SUMMARY OF THE INVENTION

Therefore, there is a desire for an optical disc type determining method and an optical disc device capable of reliably determining a CD signal surface of a double-sided dual disc and also reliably determining a plurality of types of optical discs without any new unit or without complicated processing.

The present invention has been made in view of the foregoing problem, and an invention of (1) is an optical disc type determining method of determining a mounted optical disc to be any one of the following types of selectively mountable optical discs:

a first optical disc which has a first signal surface compliant with a first recording format located a first distance away from a beam entrance surface of a first optical disc substrate, a first laser beam being applied to the first signal surface to record or reproduce an information signal;

a second optical disc which has a second signal surface compliant with a second recording format located a second distance away from a beam entrance surface of a second optical disc substrate, the value of the second distance being smaller than that of the first distance, a second laser beam at a wavelength shorter than that of the first laser beam being applied to the second signal surface to record or reproduce an information signal; and a third optical disc which has a third signal surface compliant with the first recording format located a third distance away from a beam entrance surface of a third optical disc substrate, the value of the third distance being between those of the first distance and the second distance, the first laser beam being applied to the third signal surface to record or reproduce an information signal, the method comprising:

a focus error signal detecting step of selectively applying the first and second laser beams to the signal surface of the optical disc to carry out a focus search and, at the same time, detect first and second focus error signals;

a focus error signal amplitude value detecting step of detecting first and second focus error signal amplitude values on the basis of the first and second focus error signals;

a focus balance signal value detecting step of finding a plus side level FEP and a minus side level FEM of each of the first and second focus error signals to detect first and second focus balance signal values by the calculation of $100\times(FEP-FEM)/(|FEP|+|FEM|)$; and an optical disc type determining step of determining whether the optical disc is the first optical disc with reference to at least one of the first and second focus error signal amplitude values, and then, in the case where the optical disc is determined not to be the first optical disc, determining the optical disc to be the third optical disc when a sum value of the addition of the first focus balance signal value to the second focus balance signal value is equal to or more than a predetermined threshold value, while determining the optical disc to be the second optical disc when the sum value is smaller than the predetermined threshold value.

Furthermore, an invention of (2) is the optical disc type determining method of (1), wherein by the optical disc type determining step, the first optical disc is determined to be a CD having a CD signal surface compliant with a CD format, the second optical disc is determined to be a DVD having a DVD signal surface compliant with a DVD format, and the third optical disc is determined to be an optical disc having a CD signal surface compliant with the CD format located between the CD signal surface of the CD and the DVD signal surface of the DVD.

Furthermore, an invention of (3) is an optical disc type determining method of determining a mounted optical disc to be any one of the following types of selectively mountable optical discs:

a first optical disc which has a first signal surface compliant with a first recording format located a first distance away from a beam entrance surface of a first optical disc substrate, a first laser beam being applied to the first signal surface to record or reproduce an information signal; and a second optical disc which has a second signal surface compliant with a second recording format located a second distance away from a beam entrance surface of a second optical disc substrate, the value of the second distance being smaller than that of the first distance, a second laser beam at a wavelength shorter than that of the first laser beam being applied to the second signal surface to record or reproduce an information signal, the method comprising:

a focus error signal detecting step of selectively applying the first and second laser beams to the signal surface of the optical disc to carry out a focus search and, at the same time, detect first and second focus error signals;

a focus balance signal value detecting step of finding a plus side level FEP and a minus side level FEM of each of the first and second focus error signals to detect first and second focus balance signal values by the calculation of 100×(FEP−FEM)/(|FEP|+|FEM|); and an optical disc type determining step of determining the optical disc to be the first optical disc when a sum value of the addition of the first focus balance signal value to the second focus balance signal value is equal to or more than a predetermined threshold value, while determining the optical disc to be the second optical disc when the sum value is smaller than the predetermined threshold value.

Furthermore, an invention of (4) is an optical disc device of determining a mounted optical disc to be any one of the following types of selectively mountable optical discs:

a first optical disc which has a first signal surface compliant with a first recording format located a first distance away from a beam entrance surface of a first optical disc substrate, a first laser beam being applied to the first signal surface to record or reproduce an information signal;

a second optical disc which has a second signal surface compliant with a second recording format located a second distance away from a beam entrance surface of a second optical disc substrate, the value of the second distance being smaller than that of the first distance, a second laser beam at a wavelength shorter than that of the first laser beam being applied to the second signal surface to record or reproduce an information signal; and a third optical disc which has a third signal surface compliant with the first recording format located a third distance away from a beam entrance surface of a third optical disc substrate, the value of the third distance being between those of the first distance and the second distance, the first laser beam being applied to the third signal surface to record or reproduce an information signal, the device comprising:

focus error signal detecting means for selectively applying the first and second laser beams to the signal surface of the optical disc to carry out a focus search and, at the same time, detect first and second focus error signals;

focus error signal amplitude value detecting means for detecting first and second focus error signal amplitude values on the basis of the first and second focus error signals;

focus balance signal value detecting means for finding a plus side level FEP and a minus side level FEM of each of the first and second focus error signals to detect first and second focus balance signal values by the calculation of 100×(FEP−FEM)/(|FEP|+|FEM|); and optical disc type determining means for determining whether the optical disc is the first optical disc with reference to at least one of the first and second focus error signal amplitude values, and then, in the case where the optical disc is determined not to be the first optical disc, determining the optical disc to be the third optical disc when a sum value of the addition of the first focus balance signal value to the second focus balance signal value is equal to or more than a predetermined threshold value, while determining the optical disc to be the second optical disc when the sum value is smaller than the predetermined threshold value.

Furthermore, an invention of (5) is the optical disc device of (4), wherein by the optical disc type determining means, the first optical disc is determined to be a CD having a CD signal surface compliant with a CD format, the second optical disc is determined to be a DVD having a DVD signal surface compliant with a DVD format, and the third optical disc is determined to be an optical disc having a CD signal surface compliant with the CD format located between the CD signal surface of the CD and the DVD signal surface of the DVD.

Furthermore, an invention of (6) is an optical disc device of determining a mounted optical disc to be any one of the following types of selectively mountable optical discs:

a first optical disc which has a first signal surface compliant with a first recording format located a first distance away from a beam entrance surface of a first optical disc substrate, a first laser beam being applied to the first signal surface to record or reproduce an information signal; and a second optical disc which has a second signal surface compliant with a second recording format located a second distance away from a beam entrance surface of a second optical disc substrate, the value of the second distance being smaller than that of the first distance, a second laser beam at a wavelength shorter than that of the first laser beam being applied to the second signal surface to record or reproduce an information signal, the device comprising:

focus error signal detecting means for selectively applying the first and second laser beams to the signal surface of the optical disc to carry out a focus search and, at the same time, detect first and second focus error signals;

focus balance signal value detecting means for finding a plus side level FEP and a minus side level FEM of each of the first and second focus error signals to detect first and second focus balance signal values by the calculation of 100×(FEP−FEM)/(|FEP|+|FEM|); and optical disc type determining means for determining the optical disc to be the first optical disc when a sum value of the addition of the first focus balance signal value to the second focus balance signal value is equal to or more than a predetermined threshold value, while determining the optical disc to be the second optical disc when the sum value is smaller than the predetermined threshold value.

According to the optical disc type determining method of (1), (2) and the optical disc device of (4), (5), a mounted optical disc is determined to be any one of the following types of selectively mountable optical discs: a first optical disc which has a first signal surface compliant with a first recording format located a first distance away from a beam entrance surface of a first-optical disc substrate, a first laser beam being applied to the first signal surface to record or reproduce an information signal; a second optical disc which has a second signal surface compliant with a second recording format located a second distance away from a beam entrance surface of a second optical disc substrate, the value of the second distance being smaller than that of the first distance, a second laser beam at a wavelength shorter than that of the first laser beam being applied to the second signal surface to record or reproduce an information signal; and a third optical disc which has a third signal surface compliant with the first recording format located a third distance away from a beam entrance surface of a third optical disc substrate, the value of the third distance being between those of the first distance and the second distance, the first laser beam being applied to the third signal surface to record or reproduce an information signal. At this point, in particular, whether the optical disc is the first optical disc is determined with reference to at least one of first and second focus error signal amplitude values. Then, in the case where the optical disc is determined not to be the first optical disc, the optical disc is determined to be the third optical disc when a sum value of the addition of a first focus balance signal value to a second focus balance signal value is equal to or more than a predetermined threshold value, while the optical disc is determined to be the second optical disc when the sum value is smaller than the predetermined threshold value. Thus, it is possible to accurately determine the first to third optical discs of the three types, and it is also possible to provide an optical disc device at low cost because there is no need for a new unit or complicated processing in the optical disc device to determine the type of optical disc.

In this case, as the first to third optical discs of the three types to be determined by the optical disc type determining step (optical disc type determining means), it is possible to apply a CD (first optical disc) having a CD signal surface compliant with a CD format, a DVD (second optical disc) having a DVD signal surface compliant with a DVD format, and an optical disc (third optical disc) having a CD signal surface compliant with the CD format located between the CD signal surface of the CD and the DVD signal surface of the DVD.

Furthermore, according to the optical disc type determining method of (3) and the optical disc device of (6), a mounted optical disc is determined to be any one of the following types of selectively mountable optical discs: a first optical disc which has a first signal surface compliant with a first recording format located a first distance away from a beam entrance surface of a first optical disc substrate, a first laser beam being applied to the first signal surface to record or reproduce an information signal; and a second optical disc which has a second signal surface compliant with a second recording format located a second distance away from a beam entrance surface of a second optical disc substrate, the value of the second distance being smaller than that of the first distance, a second laser beam at a wavelength shorter than that of the first laser beam being applied to the second signal surface to record or reproduce an information signal. At this point, in particular, whether the optical disc is determined to be the first optical disc when a sum value of the addition of a first focus balance signal value to a second focus balance signal value is equal to or more than a predetermined threshold value, while the optical disc is determined to be the second optical disc when the sum value is smaller than the predetermined threshold value. Thus, the determining operation is simpler than in the optical disc type determining method of (1), (2) and the optical disc device of (4), (5) described above, so that it is possible to accurately and speedily determine the first and second optical discs of the two types.

The nature, principle and utility of the invention will become more apparent from the following detailed description when read in conjunction with the accompanying drawings.

BRIEF DESCRIPTION OF THE DRAWINGS

In the accompanying drawings:

FIGS. 1A to 1D schematically show diagrams to explain a plurality of types of optical discs, wherein FIG. 1A shows a CD, FIG. 1B shows a DVD-SL having a single-layer type signal surface, FIG. 1C shows a DVD-DL having a double-layer type signal surface, and FIG. 1D shows a double-sided dual disc;

FIG. 6 is a diagram schematically showing how returning light is imaged on the multi-divided photodetector when a first CD laser beam and a second DVD laser beam are applied by a simulation to a CD signal surface of a CD, a CD signal surface of a dual disc and a signal surface of a single-layer type DVD;

FIG. 7 is a diagram showing, in association with the types of optical discs, a CD-FBAL signal value obtained when the first CD laser beam is applied to a signal surface of an optical disc and a DVD-FBAL signal value obtained when the second DVD laser beam is applied to the signal surface of the optical disc;

FIG. 8 is a diagram showing (CD-FBAL signal value)+(DVD-FBAL signal value) in association with the types of optical discs; and FIG. 9 is a flowchart for explaining a modification of part of the optical disc type determining method in the embodiment according to the present invention.

DESCRIPTION OF THE PREFERRED EMBODIMENT

One embodiment of an optical disc type determining method and an optical disc device according to the present invention will hereinafter be described in detail with reference to FIG. 2 to FIG. 9. It is to be noted that the same numbers are assigned in the following description to the same members as those previously described with FIGS. 1A to 1D.

Figure 2:
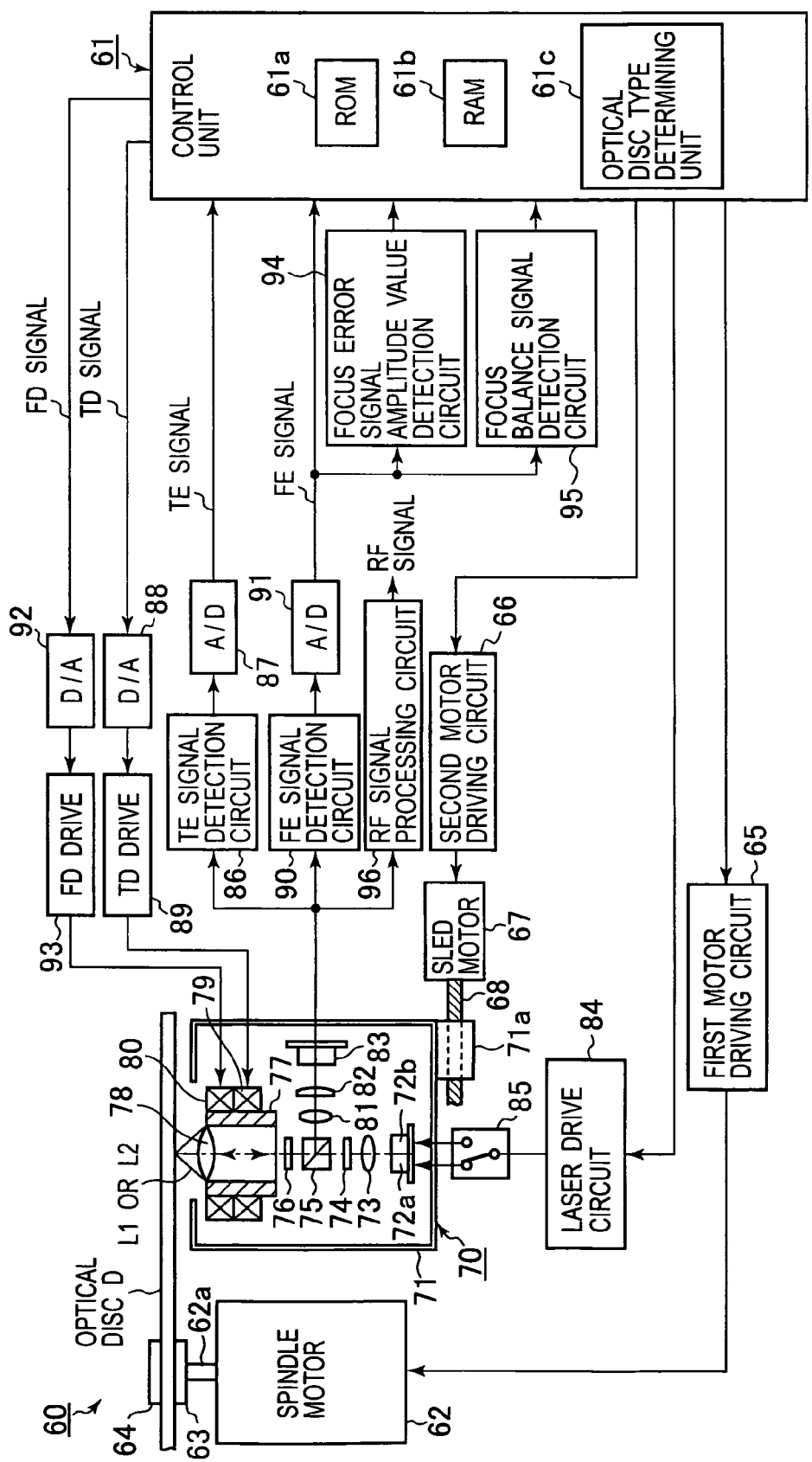
FIG. 2 is a diagram showing the whole configuration of an optical disc device according to the present invention.
Figure 3:
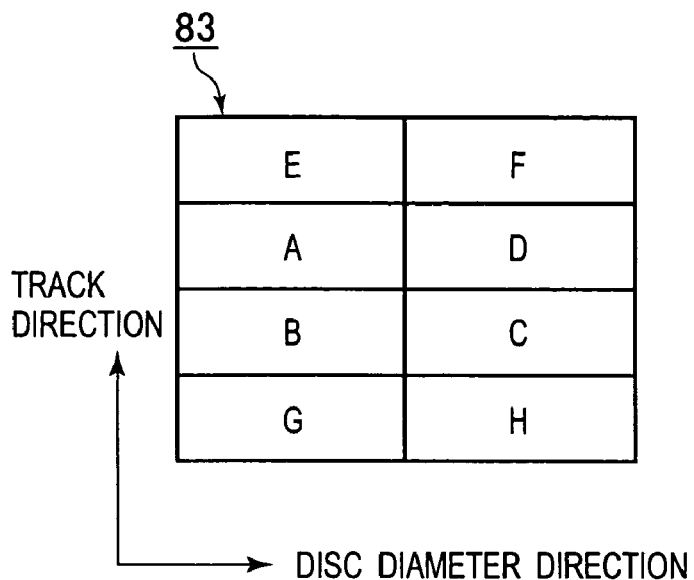
FIG. 3 is a diagram showing, in an enlarged form, a multi-divided photodetector provided in an optical pickup.
Figure 4:
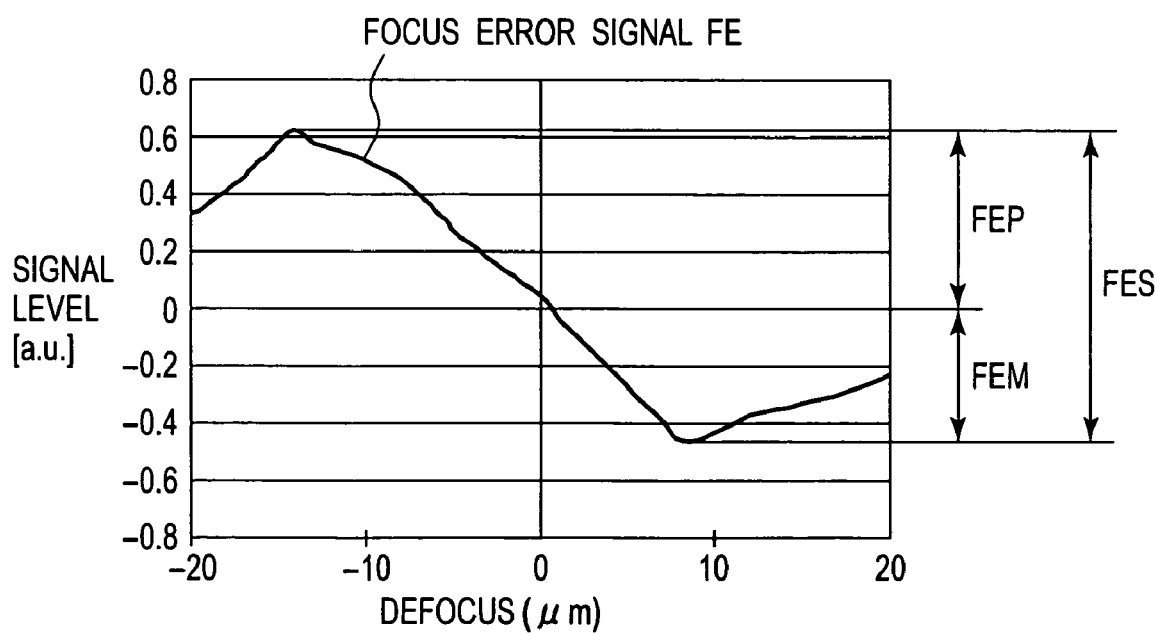
FIG. 4 is a diagram schematically showing a focus error signal to find a focus error signal amplitude value and a focus balance signal value which serve as the essential parts of the present invention.

FIG. 2 is a diagram showing the whole configuration of an optical disc device according to the present invention. FIG. 3 is a diagram showing, in an enlarged form, a multi-divided photodetector provided in an optical pickup. FIG. 4 is a diagram schematically showing a focus error signal to find a focus error signal amplitude value and a focus balance signal value which serve as the essential parts of the present invention.

As shown in FIG. 2, in an optical disc device 60 in the embodiment, there is provided a control unit 61 for controlling the entire device using a microcomputer. In the control unit 61, there are provided a ROM 61a prestoring a software for instructing in control operation, a RAM 61b temporarily storing the focus error signal amplitude value and the focus balance signal value that are described later, and an optical disc type determining unit 61c for determining the type of optical disc on the basis of the focus error signal amplitude value and the focus balance signal value that are described later.

Furthermore, the following discs can be selectively mounted in the optical disc device 60: a CD 10 having a CD signal surface 12 as described with FIGS. 1A to 1D as an optical disc D, a single-layer type DVD-SL 20 having a DVD signal surface 22, a double-layer type DVD-DL 30 having first, second DVD signal surface 32, 34, and a double-sided dual disc 40 having a CD signal surface 42 on one side and a DVD signal surface 44 on the other side.

At this point, in FIGS. 1A to 1D described above, the CD 10 having the CD signal surface 12 located about 1.2 mm away from a beam entrance surface 11a of an optical disc substrate 11 is referred to as a first optical disc. The DVD 20 having the DVD signal surface 22 located about 0.6 mm away from a beam entrance surface 21a of an optical disc substrate 21 is referred to as a second optical disc. Moreover, the optical disc on one side of the dual disc 40 having the CD signal surface 42 located about 0.9 mm away from a beam entrance surface 41a of a first optical disc substrate 41 is referred to as a third optical disc. In this case, the dual disc 40 corresponds to a combination of the first optical disc and the third optical disc.

Therefore, the first optical disc has a first signal surface (CD signal surface) compliant with a first recording format (CD format) located a first distance (about 1.2 mm) away from the beam entrance surface of the first optical disc substrate, a first laser beam (L1) being applied to the first signal surface (CD signal surface) to record or reproduce an information signal.

Furthermore, the second optical disc has a second signal surface (DVD signal surface) compliant with a second recording format (DVD format) located a second distance (about 0.6 mm) away from the beam entrance surface of the second optical disc substrate, a second laser beam (L2) at a wavelength shorter than that of the first laser beam (L1) being applied to the second signal surface (DVD signal surface) to record or reproduce an information signal.

Still further, the third optical disc has a third signal surface (CD signal surface) compliant with the first recording format (CD format) located a third distance (about 0.9 mm) away from a beam entrance surface of a third optical disc substrate, the value of the third distance being between those of the first distance (about 1.2 mm) and the second distance (about 0.6 mm), the first laser beam (L1) being applied to the third signal surface (CD signal surface) to record or reproduce an information signal.

Then, the optical disc D of an unknown type is removably mounted on a turntable 63 fixedly connected to a shaft 62a of a spindle motor 62, and is pressed from above and firmly clamped onto the turntable 63 by a disc damper 64. Moreover, the rotation number of the spindle motor 62 is controlled via a first motor driving circuit 65 which operates in accordance with an instruction from the control unit 61, such that the optical disc D can be freely rotated together with the turntable 63 and the disc damper 64.

Furthermore, an optical pickup 70 is provided under the optical disc D movably in the radial direction of the optical disc D. A screw portion 71a of an optical pickup case 71 is screwed to a lead screw 68 coupled to a SLED motor 67 which is rotationally driven by a second motor driving circuit 66 operating by an instruction from the control unit 61, such that the optical pickup 70 is provided linearly movably in the radial direction of the optical disc D.

The above-mentioned optical pickup 70 is configured using a 3-beam method to be conformable to playback-only optical disc and recordable/reproducible optical disc.

To explain in specific terms, in the optical pickup case 71 of the optical pickup 70, there are provided a first CD laser light source 72a for emitting laser light at a wavelength of the order of 780 nm and a second DVD light source 72b for emitting laser light at a wavelength of the order of 650 nm, a collimator lens 73 for converting the laser light from the first or second light source 72a or 72b into parallel light, a diffraction element 74 for separating this parallel laser light into three beams composed of a main beam and two sub-beams, a beam splitter 75 for separating the laser light from the first or second light source 72a or 72b from returning light from the optical disc D, a λ/4 plate 76 for converting the parallel laser light into circularly polarized light, an objective lens 78 which is mounted in a lens holder 77 and which selectively collects the first or second laser beam L1 or L2 of the three beams composed of the main beam and the two sub-beams onto the signal surface of the optical disc D, a tracking coil 79 and a focus coil 80 which are attached on the outer periphery of the lens holder 77 to oscillate the objective lens 78 in a tracking direction and a focus direction, and a multi-divided photodetector 83 for detecting, via a detection lens 81 and a cylindrical lens 82, the returning light of the three beams composed of the main beam and the two sub-beams reflected on the signal surface of the optical disc D.

Then, when one of the first, second light sources 72a, 72b is selectively activated via a laser drive circuit 84 and a switch 85 in accordance with an instruction of the control unit 61 to emit laser light at a predetermined wavelength, this laser light enters the objective lens 78 through the collimator lens 73, the diffraction element 74, the beam splitter 75 and the λ/4 plate 76, and the first or second laser beam L1 or L2 of the three beams composed of the main beam and the two sub-beams narrowed by the objective lens 78 reaches the signal surface of the optical disc D. The main beam is applied in a spot form to one track in the signal surface, and the two sub-beams are applied in a spot form to both sides of the one track.

At this moment, aperture limiting processing is performed for the objective lens 78 so that its numerical aperture (NA) may be about 0.45 for the CD and may be about 0.6 for the DVD on the surface side facing the λ/4 plate 76. Further, the focal distance of the objective lens 78 is set at 1.1 mm to provide an optical design which is advantageous in some degree to the CD signal surface 42 located about 0.9 mm away from the beam entrance surface 41a of the first optical disc substrate 41 in the dual disc 40 shown in FIG. 1D. The objective lens 78 is also optically designed to cause no trouble to the CD signal surface 12 located about 1.2 mm away from the beam entrance surface 11a of the optical disc substrate 11 in the CD 10 shown in FIG. 1A.

Subsequently, the returning light of the main beam and the returning light of the two sub-beams reflected on a metal reflection layer (not shown) attached onto the signal surface of the optical disc D pass through the objective lens 78 and the λ/4 plate 76 and are reflected by the beam splitter 75, and are then collected on the multi-divided photodetector 83 via detection lens 81 and the cylindrical lens 82, respectively.

Here, as shown in FIG. 3 in an enlarged form, in the multi-divided photodetector 83, there are arranged, on one semiconductor substrate (not shown), four light receiving regions A to D for detecting the returning light of the main beam applied to one track on the optical disc D, two light receiving regions E, F for detecting one of the sub-beams applied to one of the tracks adjacent to the one track, and two light receiving regions G, H for detecting the other sub-beam applied to the other of the tracks adjacent to the one track. The regions A to H are arranged in a shown relation with respect to the track direction and radial direction of the optical disc D.

Returning again to FIG. 2, at stages subsequent to the multi-divided photodetector 83 in the optical disc device 60, a tracking error signal detection circuit 86 and a first A/D converter 87 are connected to the control unit 61 as a tracking control system, and a focus error signal detection circuit 90 and a second A/D converter 91 are connected to the control unit 61 as a focus control system. Moreover, at a stage subsequent to the second A/D converter 91, a focus error signal amplitude value detection circuit 94 and a focus balance signal detection circuit 95 serving as the essential parts of the present invention are connected to the control unit 61.

Furthermore, an RF signal processing circuit 96 is provided at a stage subsequent to the multi-divided photodetector 83.

Here, the above-mentioned tracking error signal detection circuit 86 detects a tracking error signal TE for controlling the objective lens 78 in the tracking direction relative to the optical disc D, and this tracking error signal TE is arithmetically processed by a known differential push pull (DPP) method in accordance with Equation 1 below for the detection signals received in the light receiving regions A to H in the multi-divided photodetector 83 shown in FIG. 3.

$$TE=\{(A+D)-(B+C)\}+\{(E-F)+(G-H)\} \quad \text{(Equation 1)}.$$

Furthermore, the analog tracking error signal TE detected in the tracking error signal detection circuit 86 is converted into a digital tracking error signal TE in the first A/D converter 87 and input to the control unit 61. Then, a tracking control drive signal TD is generated in the control unit 61 on the basis of the tracking error signal TE and applied to the tracking coil 79 via a first D/A converter 88 and a tracking control drive signal drive circuit 89, such that the objective lens 78 can perform tracking control on the optical disc D.

Next, the focus error signal detection circuit 90 detects a focus error signal FE for controlling the objective lens 78 in the focus direction relative to the optical disc D, and this focus error signal FE is arithmetically processed by a known astigmatic method in accordance with Equation 2 below for the detection signals received in the light receiving regions A to D in the multi-divided photodetector 83 shown in FIG. 3.

$$FE=(A+C)-(B+D) \quad \text{(Equation 2)}.$$

Furthermore, the analog focus error signal FE detected in the focus error signal detection circuit 90 is converted into a digital focus error signal FE in the second A/D converter 91 and input to the control unit 61. Then, a focus control drive signal FD is generated in the control unit 61 on the basis of the focus error signal FE and applied to the focus coil 80 via a second DA converter 92 and a focus control drive signal drive circuit 93, such that the objective lens 78 can perform focus control on the optical disc D.

At this moment, the analog focus error signal FE detected in the focus error signal detection circuit 90 is obtained as shown in FIG. 4. The plus side level of this focus error signal FE is set as FEP, and the minus side level of this focus error signal FE is set as FEM. In this case, in the present invention, the first CD laser beam L1 and the second DVD laser beam L2 are applied to the signal surface of the optical disc D to find the plus side level FEP and minus side level FEM of the focus error signal FE for each of the first, second laser beams L1, L2, and a focus error signal amplitude value FES and a focus balance signal value FBAL (%) are arithmetically processed on the basis of the levels FEP, FEM, thereby determining the type of the optical disc D.

That is, after the analog focus error signal FE has been converted into the digital focus error signal FE in the second A/D converter 91, the digital focus error signal FE is sampled with predetermined timing in the focus error signal amplitude value detection circuit 94 to find the plus side level FEP and minus side level FEM of the focus error signal FE. Thus, the focus error signal amplitude value FES is arithmetically processed in accordance with Equation 3 below, and the focus error signal amplitude values FES for the first, second laser beams L1, L2 are input to the optical disc determining unit 61$c$ provided in the control unit 61.

$$FES=FEP+FEM \quad \text{(Equation 3)}.$$

At this point, in the following explanation, the focus error signal amplitude value FES obtained when the first CD laser beam L1 at a wavelength of the order of 780 nm narrowed by the objective lens 78 is applied to the signal surface of the optical disc D is referred to as a CD-FE signal amplitude value, while the focus error signal amplitude value FES obtained when the second DVD laser beam L2 at a wavelength of the order of 650 nm narrowed by the objective lens 78 is applied to the signal surface of the optical disc D is referred to as a DVD-FE signal amplitude value.

Furthermore, after the analog focus error signal FE has been converted into the digital focus error signal FE in the second A/D converter 91, the digital focus error signal FE is sampled with predetermined timing in the focus balance signal detection circuit 95 to find the plus side level FEP and minus side level FEM of the focus error signal FE. Thus, the focus balance signal value FBAL (%) is arithmetically processed in accordance with Equation 4 below, and the focus balance signal values FBAL (%) for the first, second laser beams L1, L2 are input to the optical disc determining unit 61$c$ provided in the control unit 61.

$$FBAL(\%)=100\times(FEP-FEM)/(|FEP|+|FEM|) \quad \text{(Equation 4)}.$$

At this point, the above-mentioned focus balance signal value FBAL (%) is a signal for moving the focal position of the first CD laser beam L1 or the second DVD laser beam L2 narrowed by the objective lens 78 relative to the signal surface of the optical disc D. In the following explanation, the focus balance signal value FBAL obtained by applying the first CD laser beam L1 at a wavelength of the order of 780 nm narrowed by the objective lens 78 to the signal surface of the optical disc D is referred to as a CD-FBAL signal value, while the focus balance signal value FBAL obtained by applying the second DVD laser beam L2 at a wavelength of the order of 650 nm narrowed by the objective lens 78 to the signal surface of the optical disc D is referred to as a DVD-FBAL signal value.

Next, in the above-mentioned RF signal processing circuit 96, a main data signal RF (RF signal) consisting of, for example, video data or audio data recorded in the signal surface of the optical disc D is arithmetically processed in accordance with Equation 5 below for each of the detection signals received in the light receiving regions A to D in the multi-divided photodetector 83 shown in FIG. 3.

$$RF=A+B+C+D \quad \text{(Equation 5)}.$$

Then, in the RF signal processing circuit 96, the main data signal RF (RF signal) is obtained on the basis of a predetermined format corresponding to the standard of the optical disc D in accordance with the detection result of the type of the optical disc D.

Next, the operation of determining the type of the optical disc D in the optical disc device 60 having the above-mentioned configuration is described now with FIG. 5 to FIG. 8 as well as FIG. 1 to FIG. 4 previously shown.

Figure 5:
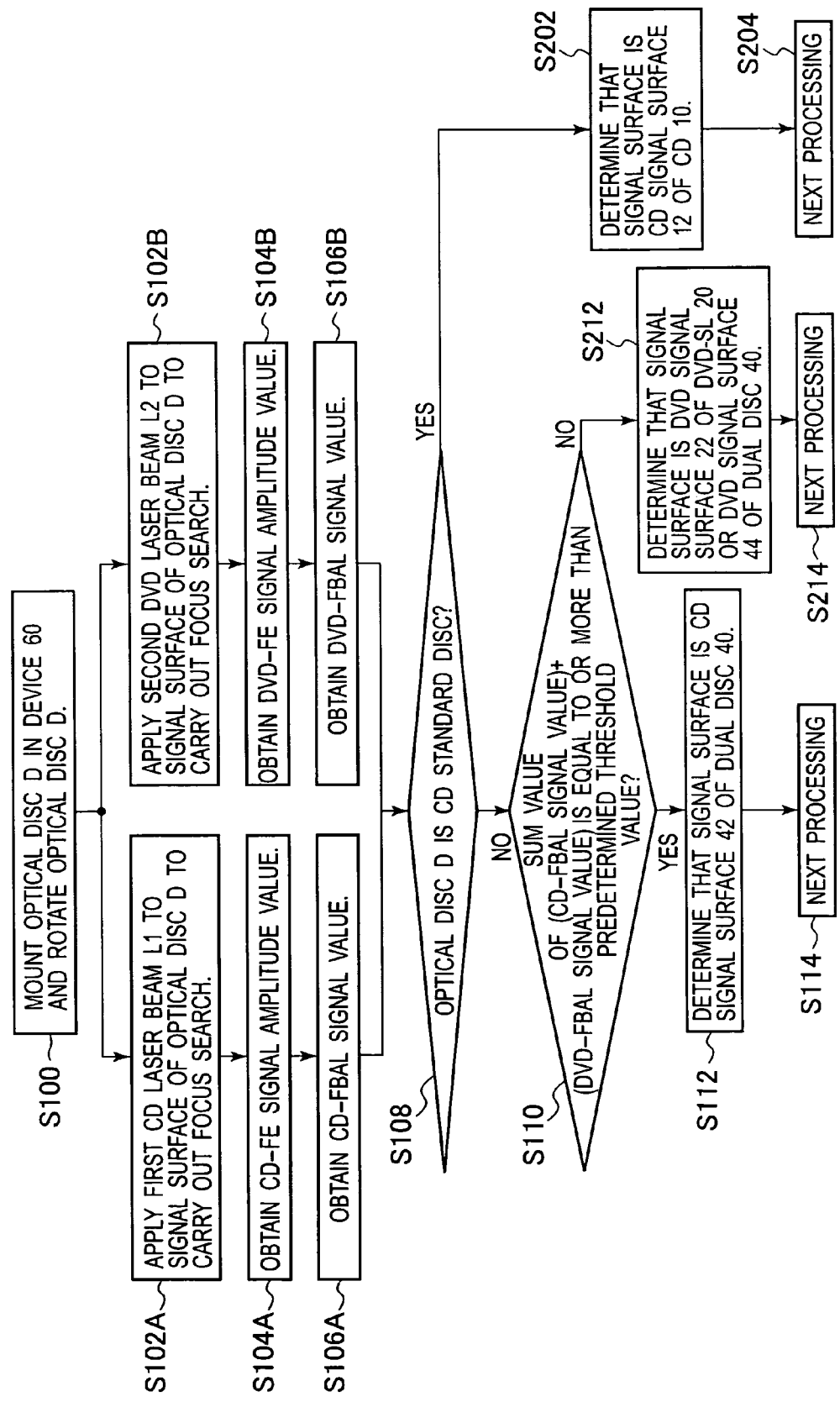
FIG. 5 is a flowchart for explaining an optical disc type determining method in an embodiment according to the present invention.

FIG. 5 is a flowchart for explaining the optical disc type determining method in the embodiment according to the present invention. FIGS. 6A to 6F are diagrams schematically showing how returning light is imaged on the multi-divided photodetector when the first CD laser beam and the second DVD laser beam are applied by a simulation to a CD signal surface of a CD, a CD signal surface of a dual disc and a signal surface of a single-layer type DVD. FIG. 7 is a diagram showing, in association with the types of optical discs, a CD-FBAL signal value obtained when the first CD laser beam is applied to the signal surface of the optical disc and a DVD-FBAL signal value obtained when the second DVD laser beam is applied to the signal surface of the optical disc. FIG. 8 is a diagram showing (CD-FBAL signal value)+ (DVD-FBAL signal value) in association with the types of optical discs.

As shown in FIG. 2 and FIG. 5, in step S100, the optical disc D of an unknown type is mounted on the turntable 63 in the optical disc device 60, and the optical disc D is rotated together with the turntable 63.

Then, the first CD laser light source 72a and the second DVD light source 72b provided in the optical pickup 70 are selectively activated to carry out both steps S102A to S106A and steps S102B to S106B, any of which may be carried out first.

That is, first, in step S102A out of steps S102A to S106A, the first CD laser beam L1 at a wavelength of the order of 780 nm narrowed by the objective lens 78 is applied to the signal surface of the optical disc D to perform a focus search, and, at the same time, the digital focus error signal FE corresponding to the first laser beam L1 is obtained by the focus error signal detection circuit 90 and the second A/D converter 91 provided in the optical disc device 60, and then the digital focus error signal FE is input to the control unit 61, the focus error signal amplitude value detection circuit 94 and the focus balance signal detection circuit 95.

Then, in step S104A, the digital focus error signal FE obtained with respect to the first laser beam L1 in step S102A is sampled with predetermined timing by the focus error signal amplitude value detection circuit 94 to obtain the CD-FE signal amplitude value in accordance with Equation 3 above, and the CD-FE signal amplitude value is temporarily stored in the RAM 61b of the control unit 61.

Then, in step S106A, the digital focus error signal FE obtained with respect to the first laser beam L1 in step S102A is sampled with predetermined timing by the focus balance signal detection circuit 95 to obtain the CD-FBAL signal value in accordance with Equation 4 above, and the CD-FBAL signal value is temporarily stored in the RAM 61b of the control unit 61.

On the other hand, in step S102B out of steps S102B to S106B, the second DVD laser beam L2 at a wavelength of the order of 650 nm narrowed by the objective lens 78 is applied to the signal surface of the optical disc D to perform a focus search, and, at the same time, the digital focus error signal FE corresponding to the second laser beam L2 is obtained by the focus error signal detection circuit 90 and the second A/D converter 91 provided in the optical disc device 60, and then the digital focus error signal FE is input to the control unit 61, the focus error signal amplitude value detection circuit 94 and the focus balance signal detection circuit 95.

Then, in step S104B, the digital focus error signal FE obtained with respect to the second laser beam L2 in step S102B is sampled with predetermined timing by the focus error signal amplitude value detection circuit 94 to obtain the DVD-FE signal amplitude value in accordance with Equation 3 above, and the DVD-FE signal amplitude value is temporarily stored in the RAM 61b of the control unit 61.

Then, in step S106B, the digital focus error signal FE obtained with respect to the second laser beam L2 in step S102B is sampled with predetermined timing by the focus balance signal detection circuit 95 to obtain the DVD-FBAL signal value in accordance with Equation 4 above, and the DVD-FBAL signal value is temporarily stored in the RAM 61b of the control unit 61.

Then, in step S108, the optical disc type determining unit 61c in the control unit 61 determines whether the optical disc D is a CD standard disc with reference to at least one of the CD-FE signal amplitude value obtained in step S104A and the DVD-FE signal amplitude value obtained in step S104B.

Here, the first CD laser beam L1 and the second DVD laser beam L2 are applied to the signal surface of the optical disc D, and the main beams of the returning light reflected by this signal surface are received in the regions A to D in the multi-divided photodetector 83. In this case, the distribution of the light received in the regions A to D is different depending on the type of the optical disc D as shown in FIGS. 6A to 6F. Thus, the focus error signal FE computed by Equation 2 above is also obtained in accordance with the distribution of the light received in the regions A to D of the multi-divided photodetector 83.

In addition, in FIGS. 6A to 6F, the regions E to H of the multi-divided photodetector 83 are intended to receive the two sub-beams to obtain the tracking error signal TE in accordance with Equation 1 above, so that these regions are not explained here.

To explain in specific terms, the distributions of the light received in the regions A to D of the multi-divided photodetector 83 are obtained by a simulation, wherein FIG. 6A shows a case where the first CD laser beam L1 is applied to the CD signal surface 12 of the CD 10, FIG. 6B shows a case where the first CD laser beam L1 is applied to the CD signal surface 42 of the dual disc 40, FIG. 6C shows a case where the first CD laser beam L1 is applied to the DVD signal surface 22 of the DVD-SL 20, FIG. 6D shows a case where the second DVD laser beam L2 is applied to the CD signal surface 12 of the CD 10, FIG. 6E shows a case where the second DVD laser beam L2 is applied to the CD signal surface 42 of the dual disc 40, and FIG. 6F shows a case where the second DVD laser beam L2 is applied to the DVD signal surface 22 of the DVD-SL 20.

In addition, although not illustrated in FIGS. 6A to 6F, the first, second DVD signal surface 32, 34 of the double-layer type DVD-DL 30 and the DVD signal surface 44 of the dual disc 40 are the same as the DVD signal surface 22 of the single-layer type DVD-SL 20 in the distance from the beam entrance surface to the signal surface, so that these signal surfaces provide the same result as that in the DVD signal surface 22.

The simulation results shown in FIGS. 6A to 6F are observed now. The focal distance of the objective lens 78 is, as described above, set at 1.1 mm so that it may be advantageous in some degree to the CD signal surface 42 of the dual disc 40 when the first laser beam L1 or the second laser beam L2 is applied to the CD signal surface 42 of the dual disc 40 in which the distance from the beam entrance surface is about 0.3 mm shorter than that in the CD signal surface 12 of the CD 10 as shown in FIG. 6B or 6E. Therefore, if defocus caused by this objective lens 78 is used in a positive way, it is possible to temporarily determine the CD signal surface 42 of the dual disc 40 to be the signal surface of the optical disc of the DVD standard at the stage where the focus error signal amplitude value FES is found because the light receiving distribution in the regions A to D of the multi-divided photodetector 83 is different from a light receiving distribution pattern for the CD signal surface 12 of the CD 10 as shown in FIG. 6A and is approximate to the light receiving distribution pattern for the optical disc of the DVD standard.

Thus, in the case where the CD-FE signal amplitude value or the DVD-FE signal amplitude value is referred to and is close to the value obtained in the CD signal surface 12 of the CD 10 (in the case of Yes) in step S108, it is possible in step S202 to determine that the signal surface of the optical disc D is the CD signal surface 12 of the CD 10. On the other hand, in the case where the CD-FE signal amplitude value or the DVD-FE signal amplitude value is far from the value obtained in the CD signal surface 12 of the CD 10 (in the case of No), it is possible to determine that the optical disc D is an optical disc other than the CD 10, in other words, an optical disc of the DVD standard. Thus, the CD signal surface 42 of the dual disc 40 is temporarily determined to be the signal surface of the optical disc of the DVD standard.

Then, after the signal surface has been determined to be the CD signal surface 12 of the CD 10 in step S202, the first CD laser beam L1 is applied to the CD signal surface 12 of the CD 10, and various conditions corresponding to the recording format of the CD standard are set, as the next processing in step S204.

On the other hand, when the optical disc is determined to be an optical disc other than the CD 10 (No) in step S108, the CD-FBAL signal value obtained in step S106A and the DVD-FBAL signal value obtained in step S106B are added together, and the type of the optical disc other than the CD 10 is determined in the optical disc type determining unit in the control unit 61 in accordance of whether or not the sum of the addition is equal to or less than a predetermined threshold value in step S110.

At this point, the measurements of the CD-FBAL signal value (%) and the DVD-FBAL signal value (%) for the signal surface of each of various optical discs are obtained as in Table 1 below.

TABLE 1

| Type of optical disc | CD-FBAL signal value with CD-LASER DIODE (%) | DVD-FBAL signal value with DVD-LASER DIODE (%) |
|---|---|---|
| CD signal surface 12 of CD 10 | 4.88 | 8.1 |
| CD signal surface 42 of dual disc 40 | −19.41 | 13.74 |
| DVD signal surface 22 of DVD-SL 20 or DVD signal surface 44 of dual disc 40 | −32.47 | −5.3 |
| DVD signal surface 44 of DVD + R | −36.84 | −3.26 |
| DVD signal surface 44 of DVD − R | −32.84 | −3.58 |

In accordance with Table 1 above, the FBAL signal values (%) corresponding to the types of optical discs are shown in FIG. 7.

In addition, marks □ in FIG. 7 indicate CD-FBAL signal values obtained when the first CD laser beam L1 is applied to the signal surface of the optical disc D, and marks ○ in FIG. 7 indicate DVD-FBAL signal values obtained when the second DVD laser beam L2 is applied to the signal surface of the optical disc D.

Moreover, although not shown in Table 1 and FIG. 7, the first, second DVD signal surfaces 32, 34 of the double-layer type DVD-DL 30 and the DVD signal surface 44 of the dual disc 40 are the same as the DVD signal surface 22 of the single-layer type DVD-SL 20 in the distance from the beam entrance surface to the signal surface, so that these signal surfaces provide the same result as that in the DVD signal surface 22.

Here, an FBAL signal (focus balance signal) used in the optical disc type determining method according to the present invention is a signal for adjusting the focus of the first, second laser beam L1, L2 narrowed by the objective lens 78 as described above on the signal surface of the optical disc D. Therefore, if the first laser beam L1 focuses on the CD signal surface compliant with the CD standard located about 1.2 mm away from the beam entrance surface, the CD-FBAL signal value is basically as designed. Likewise, if the second laser beam L2 focuses on the DVD signal surface compliant with the DVD standard located about 0.6 mm away from the beam entrance surface, the DVD-FBAL signal value is basically 0%.

However, in this embodiment, the objective lens 78 provided in the optical pickup 70 is optically designed to have a focal distance of 1.1 mm so that it may be advantageous in some degree to the CD signal surface 42 of the dual disc 40 located about 0.9 mm from the beam entrance surface, as described above.

Thus, defocus is caused when the first laser beam L1 narrowed by the objective lens 78 is applied to the CD signal surface 12 of the CD 10 located about 1.2 mm away from the beam entrance surface and to the CD signal surface 42 of the dual disc 40 located about 0.3 mm closer to the beam entrance surface than the CD signal surface 12 of the CD 10. If the defocus caused at this point is used in a positive way, the CD-FBAL signal value is not 0% any longer, so that the CD-FBAL signal value for the CD signal surface 12 of the CD 10 is 4.88% and the CD-FBAL signal value for the CD signal surface 42 of the dual disc 40 is −19.41%, as shown in Table 1 and FIG. 7.

On the other hand, when the first laser beam L1 narrowed by the objective lens 78 is applied, in contrast with the ordinary usage, to the DVD signal surface 22 of the DVD-SL 20 located about 0.6 mm from the beam entrance surface or to the DVD signal surface 44 of the dual disc 40 and the DVD signal surfaces of the DVD+R and the DVD-R, the CD-FBAL signal value for the DVD signal surface 22 of the DVD-SL 20 or the DVD signal surface 44 of the dual disc 40 is −32.47%, the CD-FBAL signal value for the DVD signal surface of the DVD+R is −36.84%, and the CD-FBAL signal value for the DVD signal surface of the DVD-R is −32.84%, as shown in Table 1 and FIG. 7.

Furthermore, when the second laser beam L2 narrowed by the objective lens 78 is applied to the DVD signal surface 22 of the DVD-SL 20 or the DVD signal surface 44 of the dual disc 40 and the DVD signal surfaces of the DVD+R and the DVD-R, the DVD-FBAL signal value is not 0% any longer either. As shown in Table 1 and FIG. 7, the DVD-FBAL signal value for the DVD signal surface 22 of the DVD-SL 20 or the DVD signal surface 44 of the dual disc 40 is −5.3%, the DVD-FBAL signal value for the DVD signal surface of the DVD+R is −3.26%, and the DVD-FBAL signal value for the DVD signal surface of the DVD-R is −3.58%.

On the other hand, when the second laser beam L2 narrowed by the objective lens 78 is applied, in contrast with the ordinary usage, to the CD signal surface 12 of the CD 10 and to the CD signal surface 42 of the dual disc 40, the DVD-FBAL signal value for the CD signal surface 12 of the CD 10 is 8.1%, and the DVD-FBAL signal value for the CD signal surface 42 of the dual disc 40 is 13.74%.

Therefore, if (CD-FBAL signal value)+(DVD-FBAL signal value) is found for the signal surface of each of the various optical discs shown in Table 1 in step S110, the sum value of these values is obtained as shown in FIG. 8.

That is, (CD-FBAL signal value)+(DVD-FBAL signal value)=4.88%+8.1%=12.98% for the CD signal surface 12 of the CD 10 in accordance with Table 1, and the +values are added together, thereby obtaining a +value as shown in FIG. 8.

Furthermore, (CD-FBAL signal value)+(DVD-FBAL signal value)=−19.41+13.74%=−5.67% for the CD signal surface 42 of the dual disc 40, and the −value and the +value offset each other, thereby obtaining a value within −10% as shown in FIG. 8.

Still further, (CD-FBAL signal value)+(DVD-FBAL signal value)=−32.47−5.3%=−37.77% for the DVD signal surface 22 of the DVD-SL 20 or the DVD signal surface 44 of the dual disc 40, and the −values are added together, thereby obtaining a value equal to or more than −30% as shown in FIG. 8.

Still further, (CD-FBAL signal value)+(DVD-FBAL signal value)=−36.84−3.26%=−40.1% for the DVD signal surface of the DVD+R, and the −values are added together, thereby obtaining a value equal to or more than −30% as shown in FIG. 8.

Still further, (CD-FBAL signal value)+(DVD-FBAL signal value)=−32.84−3.58%=−36.42% for the DVD signal surface of the DVD-R, and the −values are added together, thereby obtaining a value equal to or more than −30% as shown in FIG. 8.

In FIG. 8, if a predetermined threshold value is set at, for example, −20% for the sum value of (CD-FBAL signal value)+(DVD-FBAL signal value), the CD signal surface 12 of the CD 10 and the CD signal surface 42 of the dual disc 40 are included in the case of a value equal to or more than the predetermined threshold value (equal to or more than −20%) (in the case of Yes). However, as the CD signal surface 12 of the CD 10 has been determined in step S108, the signal surface of the optical disc D can be determined to be the CD signal surface 42 of the dual disc 40 in step S112.

Then, after the signal surface has been determined to be the CD signal surface 42 of the dual disc 40 in step S112, the first CD laser beam L1 is applied to the CD signal surface 42 of the dual disc 40, and various conditions corresponding to the recording format of the CD standard are set, as the next processing in step S114.

On the other hand, in the case where the sum value of (CD-FBAL signal value)+(DVD-FBAL signal value) is smaller than the predetermined threshold value (e.g., −20%) (in the case of No) in step S110, it is possible to determine in step S212 that the signal surface of the optical disc D is the DVD signal surface 22 of the DVD-SL 20 or the DVD signal surface 44 of the dual disc 40. Although not shown in FIG. 5, it should be understood that the DVD signal surface of the DVD+R and the DVD signal surface of the DVD-R can be determined in the same manner.

Then, after the signal surface has been determined to be the DVD signal surface 22 of the DVD-SL 20 or the DVD signal surface 44 of the dual disc 40 in step S212, the second DVD laser beam L2 is applied to the DVD signal surface 22 of the DVD-SL 20 or the DVD signal surface 44 of the dual disc 40, and various conditions corresponding to the recording format of the DVD standard are set, as the next processing in step S214.

Thus, if the sum value of the addition of the CD-FBAL signal value to the DVD-FBAL signal value is used, it is possible to accurately determine the CD signal surface 42 of the dual disc 40 temporarily determined to correspond to the DVD standard, and the DVD signal surface 22 of the DVD-SL 20 (or the DVD signal surface 44 of the dual disc 40) compliant with the DVD standard.

Therefore, according to the optical disc type determining method of the embodiment, it is possible to accurately determine the first optical disc having the first signal surface (CD signal surface) compliant with the first recording format (CD format) located the first distance (about 1.2 mm) away from the beam entrance surface of the first optical disc substrate (the CD signal surface 12 of the CD 10), the second optical disc having the second signal surface (DVD signal surface) compliant with the second recording format (DVD format) located the second distance (about 0.6 mm) away from beam entrance surface of the second optical disc substrate, the value of the second distance (about 0.6 mm) being smaller than that of the first distance (about 1.2 mm) (the DVD signal surface 22 of the DVD-SL 20 or the DVD signal surface 44 of the dual disc 40), and the third optical disc having the third signal surface (CD signal surface) compliant with the first recording format (CD format) located the third distance (about 0.9 mm) away from the beam entrance surface of the third optical disc substrate, the value of the third distance (about 0.9 mm) being between those of the first distance (about 1.2 mm) and the second distance (about 0.6 mm) (the CD signal surface 42 of the dual disc 40).

At this point, it is possible to provide optical disc device 60 at low cost because there is no need for a new unit or complicated processing in the optical disc device 60 to determine the type of optical disc D.

Next, a modification of part of the optical disc type determining method according to the embodiment is described with FIG. 9.

FIG. 9 is a flowchart for explaining the modification of part of the optical disc type determining method in the embodiment according to the present invention.

It is to be noted that, in FIG. 9, the same signs are assigned to steps which carry out the same operations as those in the embodiment previously shown in FIG. 5, and different signs are assigned to steps which are different, and points different from those in the embodiment are mainly described.

In this modification, the distance from a beam entrance surface is about 1.2 mm in a CD signal surface 12 of a CD 10, while, in contrast, the distance from a beam entrance surface is about 0.9 mm in a CD signal surface 42 of a dual disc 40. However, their recording formats are both compliant with the CD standard, so that these signal surfaces may be determined to be the signal surfaces of optical discs D compliant with the CD standard by the optical disc type determining unit 61c in the control unit 61 (FIG. 2).

On the other hand, the distance from a beam entrance surface is about 0.6 mm in a DVD signal surface 22 of a DVD-SL 20 or a DVD signal surface 44 of a dual disc 40, in a DVD signal surface of a DVD+R and in a DVD signal surface of a DVD-R, and their recording formats are all compliant with the DVD standard. Therefore, these signal surfaces may be determined to be the signal surfaces of optical discs D compliant with the DVD standard by the optical disc type determining unit 61c in the control unit 61 (FIG. 2).

Here, as has been described above in FIG. 8, it is obvious that if a predetermined threshold value (e.g., −20%) is set for the sum value of (CD-FBAL signal value)+(DVD-FBAL signal value), it is possible to determine if a signal surface is the signal surface of optical disc D compliant with the CD standard or the signal surface of optical disc D compliant with the DVD standard.

Therefore, in the optical disc type determining method of the modification shown in FIG. 9, it is possible to omit the operation of acquiring the CD-FE signal amplitude value and the DVD-FE signal amplitude value in steps S104A and S104B previously described in the embodiment in FIG. 5, and it is thus possible to omit the determination of whether the optical disc is the CD 10 or an optical disc D other than the CD 10 in step S108. Hence, it is possible to perform the operation of determining the type of optical disc in a simpler and speedier manner than in the embodiment described above, and the focus error signal amplitude value detection circuit 94 provided in the optical disc device 60 can be omitted to allow a reduction in the cost of the device 60.

Specifically, as shown in FIG. 9, step S110 inquires whether the sum value of (CD-FBAL signal value)+(DVD-FBAL signal value) is equal to or more than the predetermined threshold value (e.g., −20%), and in the case where it is equal to or more than the predetermined threshold value (in the case of Yes), it is possible in step S112A to determine that the signal surface of optical disc D is the CD signal surface 12 of the CD 10 or the CD signal surface 42 of the dual disc 40.

Then, after the signal surface has been determined to be the CD signal surface 12 of the CD 10 or the CD signal surface 42 of the dual disc 40 in step S112A, the first CD laser beam L1 is applied to the CD signal surface 42 of the dual disc 40, and various conditions corresponding to the recording format of the CD standard are set, as the next processing in step S114.

On the other hand, in the case where the sum value of (CD-FBAL signal value)+(DVD-FBAL signal value) is smaller than the predetermined threshold value (e.g., −20%) (in the case of No) in step S110, it is possible to determine in step S212 that the signal surface of the optical disc D is the DVD signal surface 22 of the DVD-SL 20 or the DVD signal surface 44 of the dual disc 40. Although not shown in FIG. 9, it should be understood that the DVD signal surface of the DVD+R and the DVD signal surface of the DVD-R can be determined in the same manner.

Then, after the signal surface has been determined to be the DVD signal surface 22 of the DVD-SL 20 or the DVD signal surface 44 of the dual disc 40 in step S212, the second DVD laser beam L2 is applied to the DVD signal surface 22 of the DVD-SL 2b or the DVD signal surface 44 of the dual disc 40, and various conditions corresponding to the recording format of the DVD standard are set, as the next processing in step S214.

Therefore, according to the optical disc type determining method of the modification, the determining operation is simpler than in the embodiment previously described, so that it is possible to accurately and speedily determine the first optical disc having the first signal surface compliant with the first recording format (CD format) (the CD signal surface 12 of the CD 10 or the CD signal surface 42 of the dual disc 40) and the second optical disc having the second signal surface compliant with the second recording format (DVD format) (the DVD signal surface 22 of the DVD 20 or the DVD signal surface 44 of the dual disc 40).

Furthermore, there has recently been developed a blu-ray disc (BD) in which much higher density is achieved than in a DVD. Although not shown here, a laser beam obtained by narrowing a laser beam at a wavelength of the order of 400 nm with an objective lens having a numerical aperture (NA) of 0.75 or more is applied to this blu-ray disc such that information signals can be recorded or reproduced on a BD signal surface located about 0.1 mm away from the beam entrance surface of the optical disc substrate.

Thus, the optical disc type determining method of the modification described above is applied so that it is possible to selectively mount, for example, a first optical disc (DVD) having a first signal surface (DVD signal surface) compliant with a first recording format (DVD format) and a second optical disc (BD) having a second signal surface (BD signal surface) compliant with a second recording format (BD format). In this case, a first focus balance signal value obtained when a first laser beam at a wavelength of the order of 650 nm is applied to a signal surface of an optical disc of an unknown type and a second focus balance signal value obtained when a second laser beam at a wavelength of the order of 400 nm is applied to a signal surface of an optical disc of an unknown type are added together, such that it is possible to accurately determine the first and second optical discs of two types by whether the sum value is equal to or more than a predetermined threshold value.

It should be understood that many modifications and adaptations of the invention will become apparent to those skilled in the art and it is intended to encompass such obvious modifications and changes in the scope of the claims appended hereto.

What is claimed is:

1. An optical disc type determining method of determining a mounted optical disc to be any one of the following types of selectively mountable optical discs:

a first optical disc which has a first signal surface compliant with a first recording format located a first distance away from a beam entrance surface of a first optical disc substrate, a first laser beam being applied to the first signal surface to record or reproduce an information signal;

a second optical disc which has a second signal surface compliant with a second recording format located a second distance away from a beam entrance surface of a second optical disc substrate, the value of the second distance being smaller than that of the first distance, a second laser beam at a wavelength shorter than that of the first laser beam being applied to the second signal surface to record or reproduce an information signal; and a third optical disc which has a third signal surface compliant with the first recording format located a third distance away from a beam entrance surface of a third optical disc substrate, the value of the third distance being between those of the first distance and the second distance, the first laser beam being applied to the third signal surface to record or reproduce an information signal, the method comprising:

a focus error signal detecting step of selectively applying the first and second laser beams to the signal surface of the optical disc to carry out a focus search and, at the same time, detect first and second focus error signals;

a focus error signal amplitude value detecting step of detecting first and second focus error signal amplitude values on the basis of the first and second focus error signals;

a focus balance signal-value detecting step of finding a plus side level FEP and a minus side level FEM of each of the first and second focus error signals to detect first and second focus balance signal values by the calculation of 100×(FEP−FEM)/(|FEP|+|FEM|); and an optical disc type determining step of determining whether the optical disc is the first optical disc with reference to at least one of the first and second focus error signal amplitude values, and then, in the case where the optical disc is determined not to be the first optical disc, determining the optical disc to be the third optical disc when a sum value of the addition of the first focus balance signal value to the second focus balance signal value is equal to or more than a predetermined threshold value, while determining the optical disc to be the second optical disc when the sum value is smaller than the predetermined threshold value.

2. The optical disc type determining method according to claim 1, wherein by the optical disc type determining step, the first optical disc is determined to be a CD having a CD signal surface compliant with a CD format, the second optical disc is determined to be a DVD having a DVD signal surface compliant with a DVD format, and the third optical disc is determined to be an optical disc having a CD signal surface compliant with the CD format located between the CD signal surface of the CD and the DVD signal surface of the DVD.

3. An optical disc type determining method of determining a mounted optical disc to be any one of the following types of selectively mountable optical discs:

a first optical disc which has a first signal surface compliant with a first recording format located a first distance away from a beam entrance surface of a first optical disc substrate, a first laser beam being applied to the first signal surface to record or reproduce an information signal; and a second optical disc which has a second signal surface compliant with a second recording format located a second distance away from a beam entrance surface of a second optical disc substrate, the value of the second distance being smaller than that of the first distance, a second laser beam at a wavelength shorter than that of the first laser beam being applied to the second signal surface to record or reproduce an information signal, the method comprising:

a focus error signal detecting step of selectively applying the first and second laser beams to the signal surface of the optical disc to carry out a focus search and, at the same time, detect first and second focus error signals;

a focus balance signal value detecting step of finding a plus side level FEP and a minus side level FEM of each of the first and second focus error signals to detect first and second focus balance signal values by the calculation of $100 \times (FEP-FEM)/(|FEP|+|FEM|)$; and an optical disc type determining step of determining the optical disc to be the first optical disc when a sum value of the addition of the first focus balance signal value to the second focus balance signal value is equal to or more than a predetermined threshold value, while determining the optical disc to be the second optical disc when the sum value is smaller than the predetermined threshold value.

4. An optical disc device of determining a mounted optical disc to be any one of the following types of selectively mountable optical discs:

a first optical disc which has a first signal surface compliant with a first recording format located a first distance away from a beam entrance surface of a first optical disc substrate, a first laser beam being applied to the first signal surface to record or reproduce an information signal;

a second optical disc which has a second signal surface compliant with a second recording format located a second distance away from a beam entrance surface of a second optical disc substrate, the value of the second distance being smaller than that of the first distance, a second laser beam at a wavelength shorter than that of the first laser beam being applied to the second signal surface to record or reproduce an information signal; and a third optical disc which has a third signal surface compliant with the first recording format located a third distance away from a beam entrance surface of a third optical disc substrate, the value of the third distance being between those of the first distance and the second distance, the first laser beam being applied to the third signal surface to record or reproduce an information signal, the device comprising:

focus error signal detecting means for selectively applying the first and second laser beams to the signal surface of the optical disc to carry out a focus search and, at the same time, detect first and second focus error signals;

focus error signal amplitude value detecting means for detecting first and second focus error signal amplitude values on the basis of the first and second focus error signals;

focus balance signal value detecting means for finding a plus side level FEP and a minus side level FEM of each of the first and second focus error signals to detect first and second focus balance signal values by the calculation of $100 \times (FEP-FEM)/(|FEP|+|FEM|)$; and optical disc type determining means for determining whether the optical disc is the first optical disc with reference to at least one of the first and second focus error signal amplitude values, and then, in the case where the optical disc is determined not to be the first optical disc, determining the optical disc to be the third optical disc when a sum value of the addition of the first focus balance signal value to the second focus balance signal value is equal to or more than a predetermined threshold value, while determining the optical disc to be the second optical disc when the sum value is smaller than the predetermined threshold value.

5. The optical disc device according to claim 4, wherein by the optical disc type determining means, the first optical disc is determined to be a CD having a CD signal surface compliant with a CD format, the second optical disc is determined to be a DVD having a DVD signal surface compliant with a DVD format, and the third optical disc is determined to be an optical disc having a CD signal surface compliant with the CD format located between the CD signal surface of the CD and the DVD signal surface of the DVD.

6. An optical disc device of determining a mounted optical disc to be any one of the following types of selectively mountable optical discs:

a first optical disc which has a first signal surface compliant with a first recording format located a first distance away from a beam entrance surface of a first optical disc substrate, a first laser beam being applied to the first signal surface to record or reproduce an information signal; and a second optical disc which has a second signal surface compliant with a second recording format located a second distance away from a beam entrance surface of a second optical disc substrate, the value of the second distance being smaller than that of the first distance, a second laser beam at a wavelength shorter than that of the first laser beam being applied to the second signal surface to record or reproduce an information signal, the device comprising:

focus error signal detecting means for selectively applying the first and second laser beams to the signal surface of the optical disc to carry out a focus search and, at the same time, detect first and second focus error signals;

focus balance signal value detecting means for finding a plus side level FEP and a minus side level FEM of each of the first and second focus error signals to detect first and second focus balance signal values by the calculation of $100 \times (FEP-FEM)/(|FEP|+|FEM|)$; and optical disc type determining means for determining the optical disc to be the first optical disc when a sum value of the addition of the first focus balance signal value to the second focus balance signal value is equal to or more than a predetermined threshold value, while determining the optical disc to be the second optical disc when the sum value is smaller than the predetermined threshold value.

* * * * *